(12) United States Patent
Duggi et al.

(10) Patent No.: US 8,134,995 B2
(45) Date of Patent: Mar. 13, 2012

(54) MOBILE AD-HOC NETWORK ROUTING BASED UPON HARDWARE ADDRESS

(75) Inventors: Mohan Reddy Duggi, Garland, TX (US); Gowri Shankar, Chennai (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 11/653,036

(22) Filed: Jan. 12, 2007

(65) Prior Publication Data
US 2008/0170518 A1     Jul. 17, 2008

(51) Int. Cl.
*H04B 7/00* (2006.01)
(52) U.S. Cl. .......... 370/349; 370/310; 370/338
(58) Field of Classification Search .......... 370/310–350; 455/422.1–460, 524–525
See application file for complete search history.

(56) References Cited

U.S. PATENT DOCUMENTS
2005/0041628 A1*  2/2005  Duggi et al. ........... 370/338

FOREIGN PATENT DOCUMENTS
WO    WO 2006098723 A1 *  9/2006
* cited by examiner

*Primary Examiner* — Kent Chang
*Assistant Examiner* — Kashif Siddiqui

(57) ABSTRACT

A system, method, and computer readable medium for mobile ad hoc network routing based upon a hardware address that comprises, identifying a destination node hardware address of a data packet that is outbound from a host node, searching a host node routing table for a destination node route from the host node to the destination node hardware address, routing the data packet to the destination node route in the event that the host node routing table returns a destination node hardware address, appending a flooding packet to the data packet in the event that the host node routing table returns a null destination node hardware address, and broadcasting the data packet to at least one neighbor node if the data packet has the flooding packet appended to it.

39 Claims, 10 Drawing Sheets

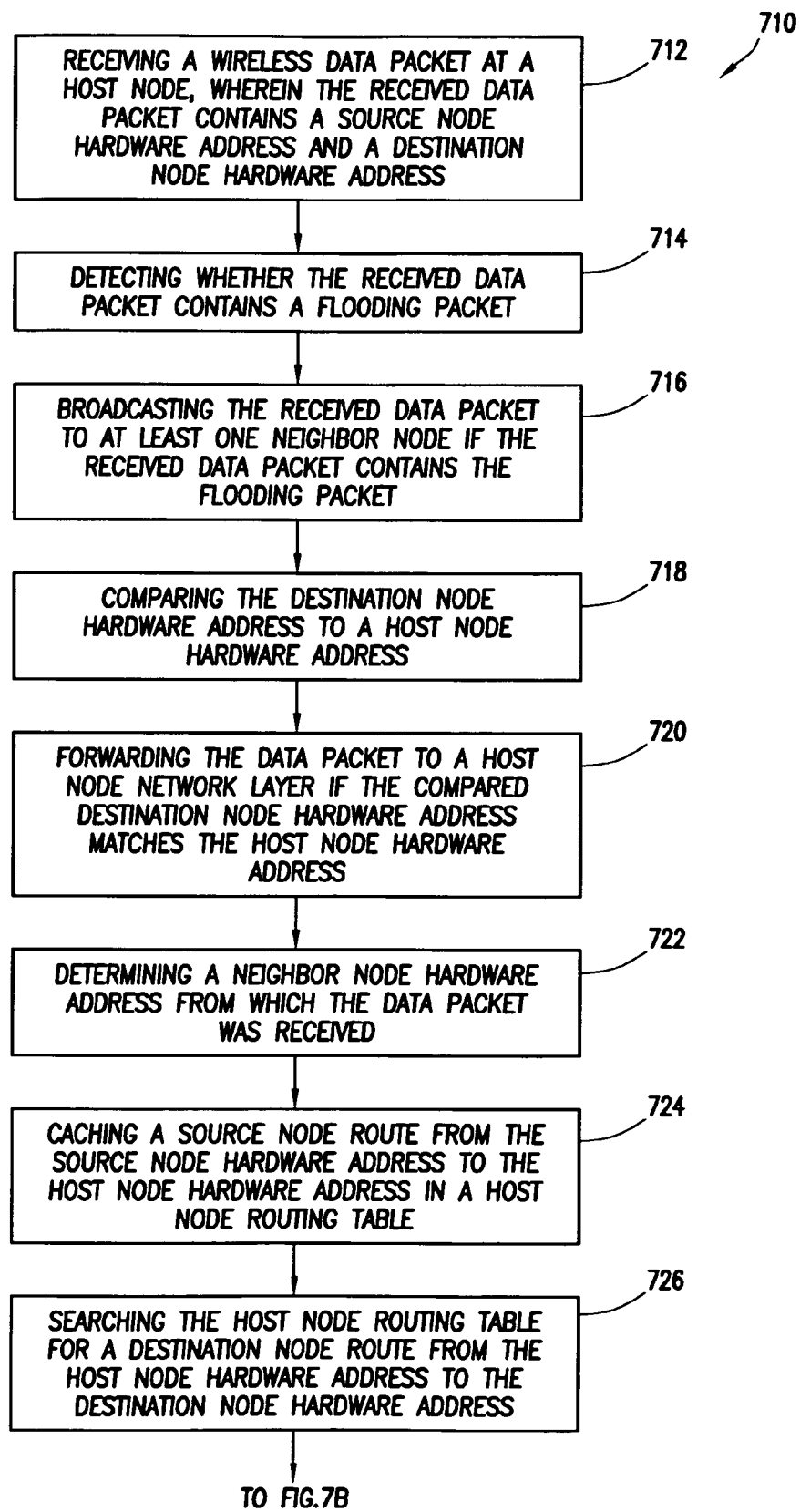

MOBILE AD-HOC NETWORK ROUTING BASED UPON HARDWARE ADDRESS

CROSS REFERENCE TO RELATED APPLICATIONS

The present patent application is related to commonly assigned U.S. patent application Ser. No. 10/764,130, filed on Jan. 23, 2004 entitled APPARATUS AND METHOD FOR TRANSPARENT LAYER 2 ROUTING IN A MOBILE AD HOC NETWORK, the entire contents of which are enclosed by reference herein.

FIELD OF THE INVENTION

The present invention is generally related to mobile ad-hoc network routing and, more specifically to mobile ad-hoc network routing based upon a hardware address.

BACKGROUND OF THE INVENTION

Wireless networks follow one of two basic structures, fixed router based in which a backbone of fixed routers communicates with wireless nodes, and mobile router based in which the routers themselves are a part of the wireless node and form a self-configuring network of wireless links. In the mobile router based system, the routers are free to randomly move, leave and enter the system. Therefore, the mobile router based system links can change rapidly in both number and relative position. The links connecting nodes in a network is called a topology of the network. In an infrastructure-based system, a source wireless node communicates via a wireless link with a fixed router which in turn communicates within the infrastructure and further communicates via another wireless link to a destination wireless node. The source and destination wireless nodes communicate primarily through the fixed network topology. A mobile ad-hoc network (MANET) communicates primarily between wireless nodes, without a need for fixed routers. The topology of the MANET is self-configuring with the nodes themselves providing the routing function. The MANET does not require connection to a fixed router, but may be connected to a number of wireless networks (such as a cellular network) or to a number of data networks (such as the Internet).

The evolution and expansion of the Internet and networking has necessitated the expansion of internet protocols from IPv4 (having $4.3 \times 10^9$ addresses) to the most recent IPv6 (having $3.4 \times 10^{38}$ addresses). This expansion in Internet protocols has increased the overhead necessary to implement current MANETs since by their original design they communicated at the Internet Protocol (IP) layer. One embodiment of the present invention addresses a fundamental limitation of the original and more recent MANET architectures.

The routing protocols for MANETs fall into one of several groups including pro-active (which is table driven and maintains a list of destination nodes and routes), reactive (which finds a route only when needed), hybrid (which is a mixture of pro-active and reactive), hierarchical, geographical, power aware (due to the fact that power required to transmit a message varies as a square of the distance), multicast, and geographical multicast. Within each group there are multiple protocols, therefore the number of possible protocols available for use is extensive. A common type of MANET routing is reactive routing so, for illustration purposes only, that will be the routing topology utilized to describe the present invention. One node communicating with its next closest neighbor is referred to as local link, peer-to-peer, or single hop communication.

Network communication is primarily based on a model referred to as Open System Interconnection (OSI), which has seven layers of functions, with each layer using only the functions of the layers below and exporting functions only to the layer above. The seven layers are the physical layer, the data link layer, the network layer, the transport layer, the session layer, the presentation layer and the application layer. Computational overhead increases with each successive layer. The layers that are most directly related to this invention are the data link layer (layer 2) and the network layer (layer 3). The data link layer provides an ability to transfer data between network nodes and the addressing in the data link layer is physical and is referred to as Media Access Control (MAC). The network layer provides a function of transferring variable length data sequences between a source node and a destination node and provides network routing, flow control and segmentation and de-segmentation of the data. Currently, routers typically operate in the network layer.

SUMMARY OF THE INVENTION

Prior art MANET networks utilize IP addressing for routing protocols. Such IP addressing will require re-implementation of the routing protocol for every new network layer protocol such as IPv6.

The present invention utilizes hardware addressing to make the entire MANET appear as a single link to every node within the MANET. This use of the MAC address occurs between the data link layer and the network layer, thus bypassing the routing protocol IP address.

The present invention runs between the data link layer (hereinafter also referred to as the MAC layer or layer 2) and the network layer (hereinafter also referred to as the IP layer or layer 3). Data packets sent from the network layer to the data link layer are considered outbound. Data packets sent from the data link layer to the network layer are considered inbound. Inbound and outbound data packets are routed through a MANET Routing Protocol (MARP) layer of the present invention. The MARP layer, which is positioned between the MAC layer and the IP layer, constructs a routing table containing MAC addresses. Each data packet contains a Media Access Control header.

Outbound data packets have their destination MAC address read by the MARP layer. A routing table utilizes the MAC address as a key. In one embodiment of the present invention, the routing table is searched for a destination MAC address and if the address is found, the data packet is sent to the next hop. If the destination MAC address is not located in the routing table, a route discovery is performed. Route discovery consists of sending a flooding packet appended to the data packet and broadcasting the resulting data packet to the entire MANET. Broadcasting is defined as the sending of the resulting data packet from the host node to each neighbor node in communication with the host node.

Inbound data packets have their destination MAC address read by a media address resolution protocol module. In one embodiment of the present invention if the inbound data packet contains a flooding packet, the data packet is rebroadcast and one copy is sent to the network layer. If the destination address matches the MAC address of the node, the data packet is sent to the network layer. If the destination MAC address is in the routing table, the packet is sent to the next hop.

The first time a data packet is sent to a destination node, a broadcast route request message is sent to the entire MANET and a unicast route response message is returned from the destination node. Each node receiving the route request message stores the node that the request came from to construct a route back to the originator of the request. This allows the route reply to be unicast back from the destination along the stored path back to the originator. During the route reply, each of the nodes along the path stores the node that returned the reply so that a bi-directional route is established between the nodes.

In one embodiment of the present invention, a method for mobile ad hoc network routing based upon a hardware address comprises, identifying a destination node hardware address of a wireless data packet that is outbound from a host node, searching a host node routing table for a destination node route from the host node to the destination node hardware address, routing the received data packet to the destination node route in the event that the host node routing table returns a destination node hardware address, appending a flooding packet to the data packet in the event that the host node routing table returns a null destination node hardware address, and broadcasting the received data packet to at least one neighbor node if the received data packet has the flooding packet appended to it.

In a further embodiment of the present invention, a method for mobile ad hoc network routing based upon a hardware address comprises, receiving a wireless data packet at a host node, wherein the received data packet contains a source node hardware address and a destination node hardware address, detecting whether the received data packet contains a flooding packet, broadcasting the received data packet to at least one neighbor node if the received data packet contains the flooding packet, comparing the destination node hardware address to a host node hardware address, forwarding the data packet to a host node network layer if the compared destination node hardware address matches the host node hardware address, determining a neighbor node hardware address from which the data packet was received, caching a source node route from the source node hardware address to the host node hardware address in a host node routing table, searching the host node routing table for a destination node route from the host node hardware address to the destination node hardware address, and routing the received data packet to the destination node route.

In yet a further embodiment of the present invention, a computer readable medium comprises instructions for, receiving a wireless data packet at a host node, wherein the received data packet contains a source node hardware address and a destination node hardware address, determining a neighbor node hardware address from which the data packet was received, detecting whether the received data packet has a flooding packet appended to it, caching a source node route from the source node hardware address to the host node hardware address in a host node routing table in the event a flooding packet is detected, and storing a destination node route from the destination node hardware address to the host node hardware address in the host node routing table in the event the data packet does not have the flooding packet appended to it.

In another embodiment of the present invention, a system for mobile ad hoc network routing based upon a hardware address comprises, a transceiver for receiving and transmitting wireless data packets, a processor connected to the transceiver, wherein the processor identifies a destination hardware address of the wireless data packet, detects whether the data packet contains a flood packet, determines a neighbor node hardware address from which the data packet was received, stores a source node route from the source node hardware address to the host node hardware address in a host node routing table in the event a flooding packet is detected, stores a destination node route from the destination node hardware address to the host node hardware address in the host node routing table in the event the data packet does not have the flooding packet appended to it, broadcasts the data packet to at least one neighbor node if the data packet contains the flood packet, searches a host node routing table for a destination node route and unicasts the wireless data packet to the source node route, and a memory communicably coupled to the processor, wherein the memory stores the source node route and wherein the memory stores the destination node route.

In yet another embodiment of the present invention, a system for mobile ad hoc network routing based upon a hardware address comprises a processor that identifies a destination hardware address of a data packet, detects whether the data packet contains a flood packet, determines a neighbor node hardware address from which the data packet was received, and broadcasts the data packet to at least one neighbor node if the data packet contains the flood packet.

DETAILED DESCRIPTION OF THE INVENTION

A functional impasse is being approached in which low cost, low power consumption for many mobile devices necessitates lowered computational capabilities at the same time that vastly expanded IPv6 addressing is mixed with legacy IPv4 addressing. The present invention addresses this impasse by utilizing the MAC address for routing instead of utilizing the IP address and performing the routing function between the data link layer and the network layer. The present invention may independently or in combination, statically or dynamically utilize any routing protocol. Further, the present invention is concerned primarily with multi-hop, remote-to-remote communication in order to establish a functional network. In other embodiments, networks can be established that are not multi-hop or employ remote-to-remote communication without departing from the scope of the present invention.

The system, method, and computer readable medium of the present invention utilize a hardware address to provide mobile ad hoc network routing. The routing of the mobile ad hoc network via a hardware address reduces the computational overhead and the complication of dealing with multiple IP protocols and provides a more efficient and robust transfer of information.

Figure 1:
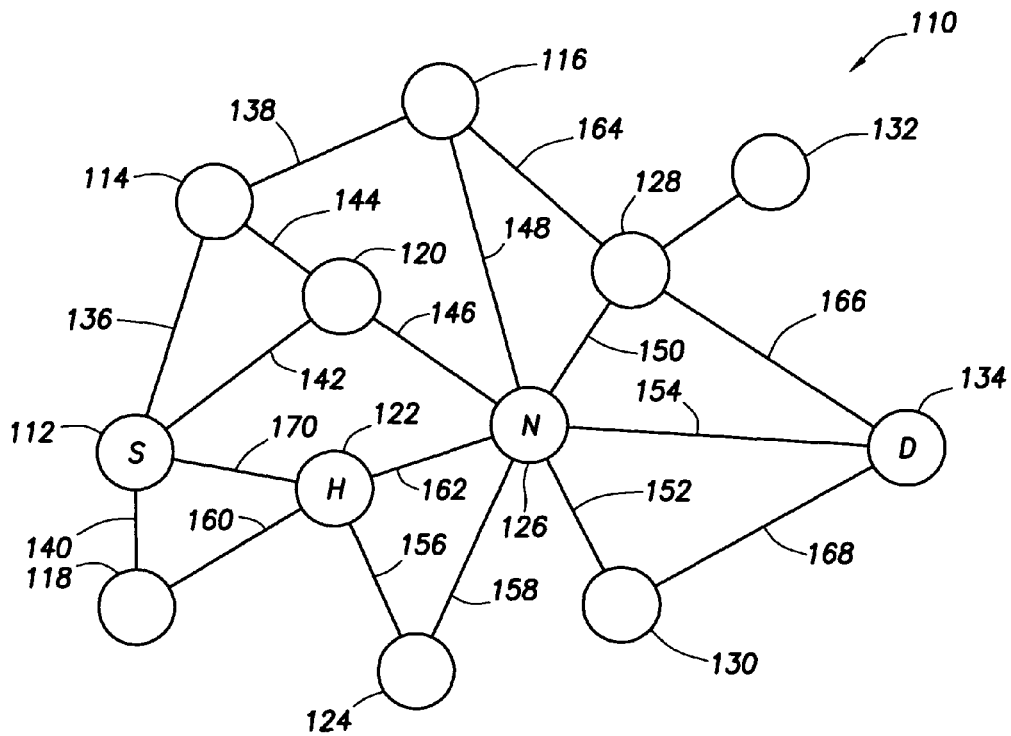
FIG. 1 depicts a mobile ad hoc network in accordance with a preferred embodiment of the present invention.

Referring now to FIG. 1, a mobile ad hoc network 110 is depicted and comprises a number of blocks or modules that are software, hardware, or firmware, and/or the combination of software, hardware, and/or firmware. The nodes in this example are nodes 112-134. The nodes are connected by links 136-168. As an example, if a message were to initiate at a source node S 112, bound for a destination node D 134, a number of intermediate nodes could be used to transfer the message. Source node 112 is connected to node 114 via link 136, to 118 via link 140 and to node 122 via link 170. In this example a flood message is multicast from the source node 112 to locate the destination node 134. The flood message tells each node that the source node is looking for the destination node. The flood message is appended to a data packet so that the information is also sent at the same time that the route is being deciphered.

A host node is one that either receives or sends a data packet and in most cases it is a role that a node would transiently play in the process of data transfer. Each host node that intercepts the flood packet keeps track of which node the flood packet came from. In this way, it is possible to locate the source node from each connected node in the network. In this example, the flood message and data packet are communicated from source node 112 to host node H 122 via link 170. The host node 122 receives the data packet and communicates with its neighbor node 124 via link 156 and neighbor node 126 via link 162. The neighbor nodes acting as the new host nodes re-forward the flooding packet and check their machine addresses to determine whether they are the destination nodes. Neighbor node N 126 that is now the new host node communicates with node 124 via link 158, node 130 via link 152, node 134 via link 154, node 128 via link 150, node 116 via link 148, node 120 via link 146, and node 122 via link 162. However, nodes 124 and 122 have previously received the flood packet, to re-receive the flood packet would create a loop and is prevented by review of a sequence number of the request. This use of the sequence number to prevent loops is accomplished by only updating a route if the sequence number is higher than a destination sequence number in the route table, if the sequence numbers are identical and a hop count plus one is smaller than the hop count in the routing table, or if the sequence number is unknown. If the sequence number shows that the flood packet was previously received, the host node route table discards the new path. Link 154 provides communication from node 126 to the destination node 134, which has the machine address that is needed.

Continuing with the present example, the data packet has been received at the destination node 134. The movement of the data packet from the source node to the destination node is termed the source route. The source route takes place in a number of hops from the source node to the destination node. Each of the hops tracks the movement of data as it is traversing through the network, and each node stores the movement of the data packet in that node's route table. The source route from source node 112 has been stored in the route table of host node 122. The source route from node 122 to node 126 has been stored in the host node's 126 route table. Finally, the source route from node 126 to destination node 134 has been stored in the host node's 134 route table. This routing of the source route allows a return message to be sent backtracking the route to the source node. The return message is unicast back from the destination node 134 to the source node 112, and does not have a flooding packet appended to the data packet. This lack of an appended flood packet acts as a signal that the message is a return message and that the node from which the data packet came from is a destination route. This multicast flood, followed by a unicast return message allows each host node routing table to track and then direct the flow of data traffic between the two nodes so that bi-directional traffic can occur and no longer requires a flood packet once the routing is established.

Figure 2:
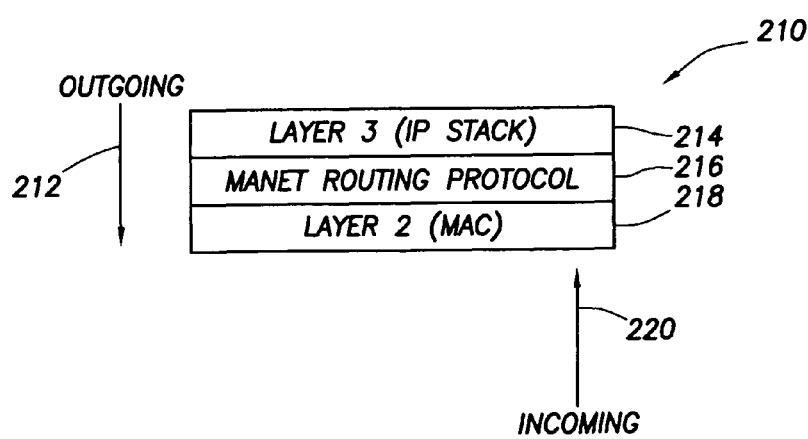
FIG. 2 depicts a mobile router diagram of a mobile ad hoc network in accordance with a preferred embodiment of the present invention.

Referring now to FIG. 2, a mobile router diagram 210 of the mobile ad hoc network is depicted and comprises a number of blocks or modules that are software, hardware, or firmware, and/or the combination of software, hardware, and/or firmware. Outgoing data packets 212 flow from layer 3, 214, through the MANET Routing Protocol (MARP) 216, to layer 2, 218. The MARP resides between layer 2, the hardware address layer, and layer 3, the network layer. With the present invention, no changes need to be made to the IP layer 214 or to the MAC layer 218 in order to allow the MARP 216 to perform the functionality of the present invention. The most common hardware address protocol is the MAC protocol, and the most common network address protocol is IP. Incoming data packets 220 travel from layer 2, through the MARP to layer 3. The MARP additionally decides when to forward a data packet to layer 3 and the routing protocol to use in deciding which neighbor node is preferential with respect to routing.

Figure 3:
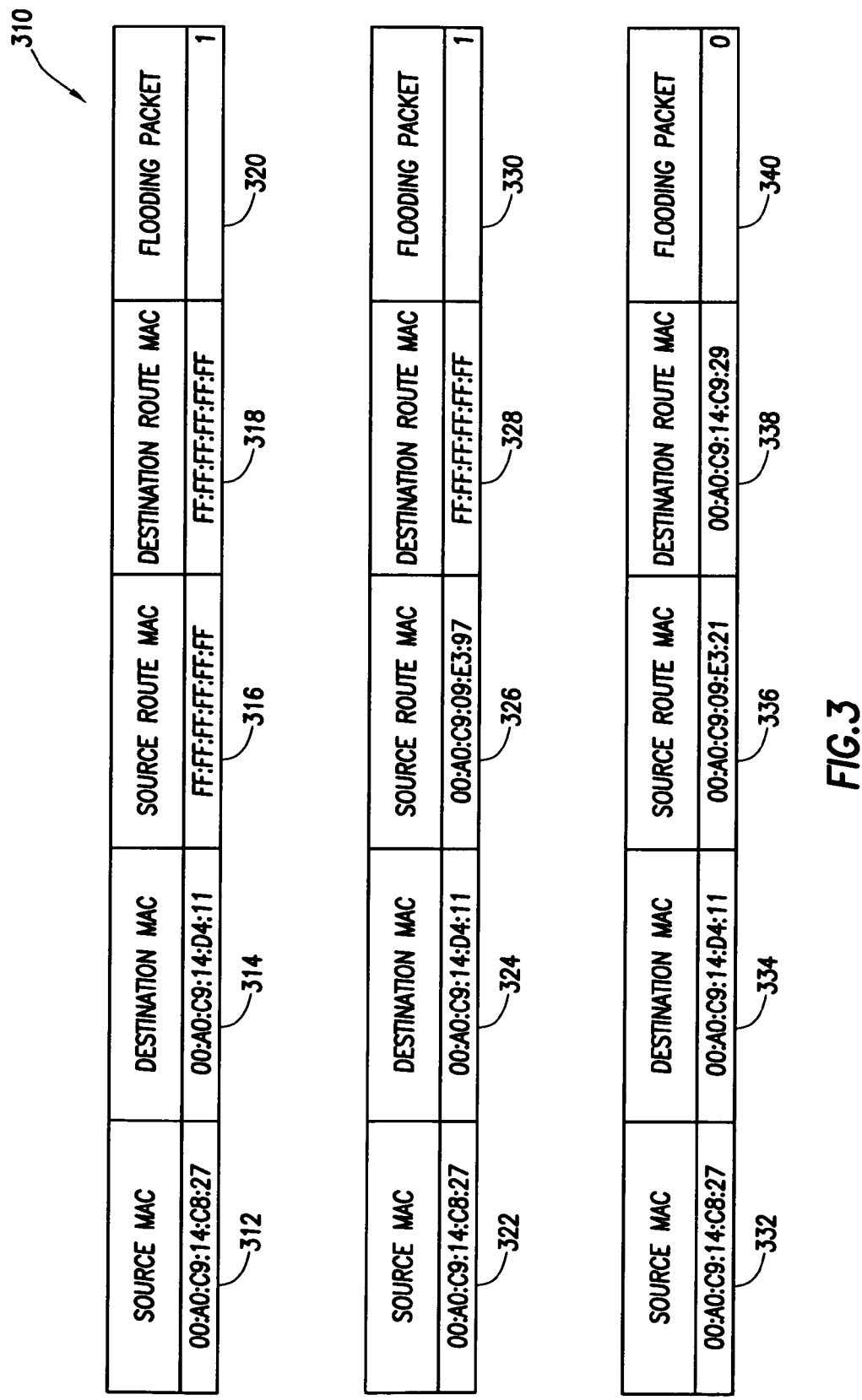
FIG. 3 depicts a mobile ad hoc network routing table in accordance with a preferred embodiment of the present invention.

Referring now to FIG. 3, a mobile ad hoc network routing table 310 is depicted and comprises a number of blocks or modules that are software, hardware, or firmware, and/or the combination of software, hardware, and/or firmware. When a new route is to be configured, no addresses except the source 312 address and the destination 314 address are known, the source route machine address 316 and the destination route machine address 318 are both null and a flood packet 320 is appended to the data packet. As the flood packet moves through the network from the source 322 to the destination 324, the source route machine address 326 is discovered, the destination route machine address 328 is still null, and the flood packet is still being forwarded from host nodes to neighbor nodes. On the unicast return trip, the route table has the complete information necessary to route communications between the source machine address 332, the destination machine address 334, the source route machine address 336, and the destination route machine address 338 without the need for a flood packet 340.

Figure 4:
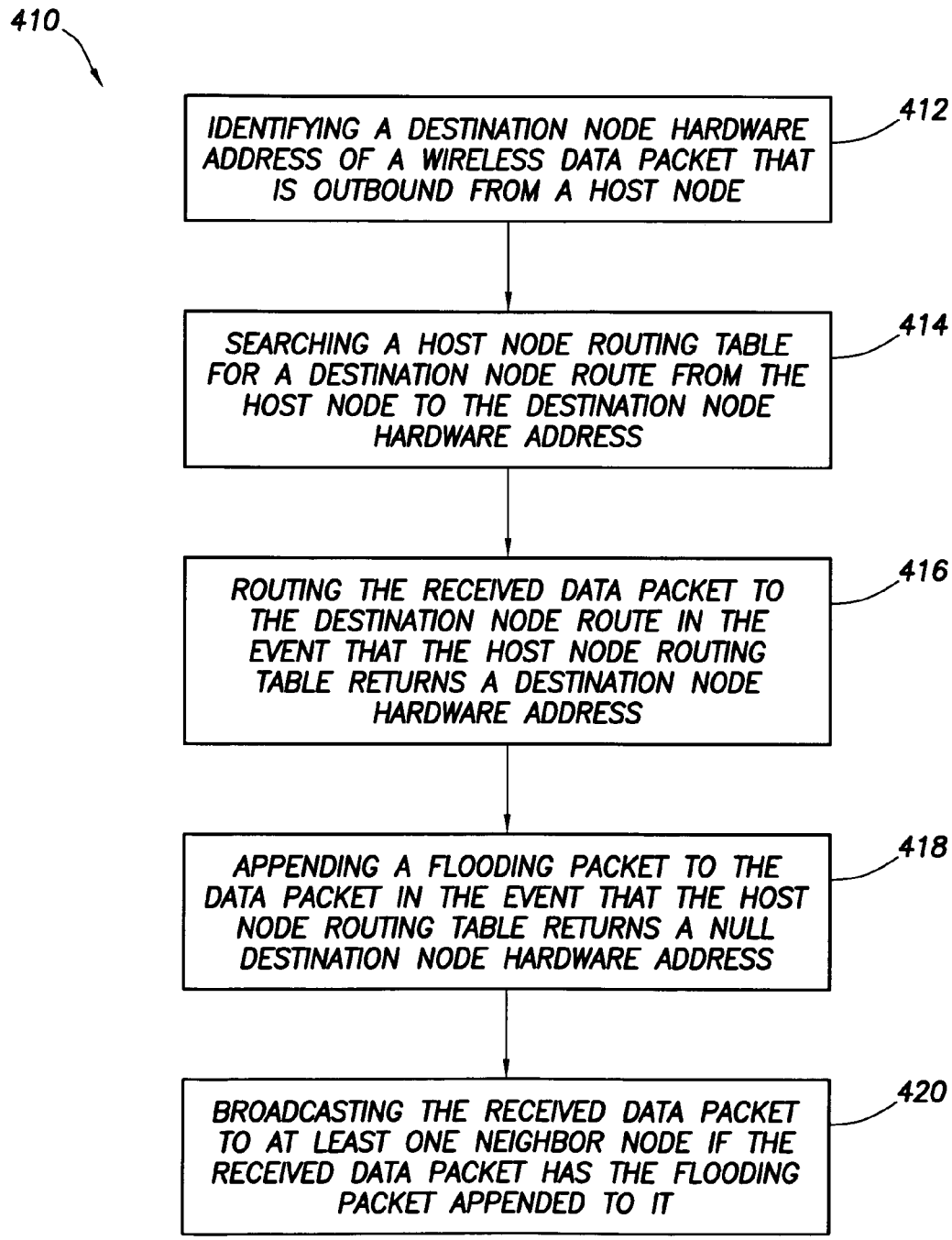
FIG. 4 depicts a first method of mobile ad hoc network routing based upon a hardware address in accordance with a preferred embodiment of the present invention.

Referring now to FIG. 4, a first method of mobile ad hoc network routing based upon a hardware address 410 is depicted. The first method comprises, identifying 412 a destination node hardware address of a wireless data packet that is outbound from a host node and searching 414 a host node routing table for a destination node route from the host node to the destination node hardware address. The method also comprises routing 416 the received data packet to the destination node route in the event that the host node routing table returns a destination node hardware address, appending 418 a flooding packet to the data packet in the event that the host node routing table returns a null destination node hardware address, and broadcasting 420 the received data packet to at least one neighbor node if the received data packet has the flooding packet appended to it. The method is performed by software, hardware, or firmware, and/or the combination of software, hardware, and/or firmware.

Figure 5:
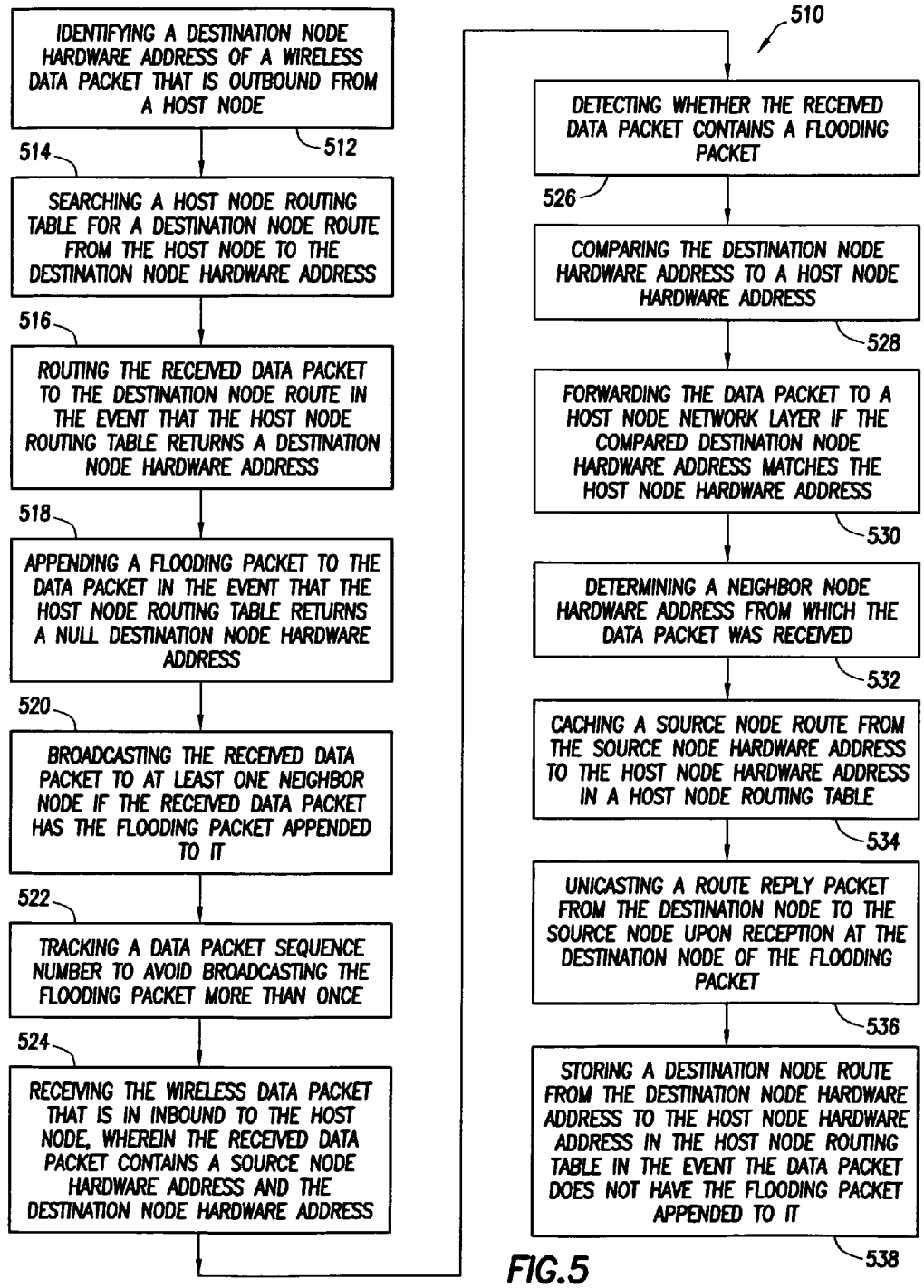
FIG. 5 depicts a second method of mobile ad hoc network routing based upon a hardware address in accordance with a preferred embodiment of the present invention.

Referring now to FIG. 5, a second method of mobile ad hoc network routing based upon a hardware address 510 is depicted. The second method comprises, identifying 512 a destination node hardware address of a wireless data packet that is outbound from a host node (sent from the MARP to layer 2), searching 514 a host node routing table for a destination node route from the host node to the destination node hardware address, routing 516 the received data packet to the destination node route in the event that the host node routing table returns a destination node hardware address and appending 518 a flooding packet to the data packet in the event that the host node routing table returns a null destination node hardware address. The method further comprises broadcasting 520 the received data packet to at least one neighbor node if the received data packet has the flooding packet appended to it. Broadcasting is defined as the sending of the data packet from the host node to each the neighbor node in communication with the host node. The method may also comprise tracking 522 a data packet sequence number to avoid broadcasting the flooding packet more than once, receiving 524 the wireless data packet that is in inbound to the host node, wherein the received data packet contains a source node hardware address and the destination node hardware address and detecting 526 whether the received data packet contains a flooding packet. The method may also comprise comparing 528 the destination node hardware address to a host node hardware address, forwarding 530 the data packet to a host node network layer if the compared destination node hardware address matches the host node hardware address and determining 532 a neighbor node hardware address from which the data packet was received. The method may additionally comprise caching 534 a source node route from the source node hardware address to the host node hardware address in a host node routing table, unicasting 536 a route reply packet from the destination node to the source node upon reception at the destination node of the flooding packet and storing 538 a destination node route from the destination node hardware address to the host node hardware address in the host node routing table in the event the data packet does not have the flooding packet appended to it. The host node routing table may include a source node internet protocol address, and may include a destination node internet protocol address. The MARP routing protocols may be pro-active which is table driven and maintains a list of destination nodes and routes, reactive which finds a route only when needed, hybrid which is a mixture of pro-active and reactive, hierarchical, geographical, power aware due to the fact that power required to transmit a message varies as a square of the distance, multicast, and geographical multicast. The method is performed by software, hardware, or firmware, and/or the combination of software, hardware, and/or firmware.

Figure 6:
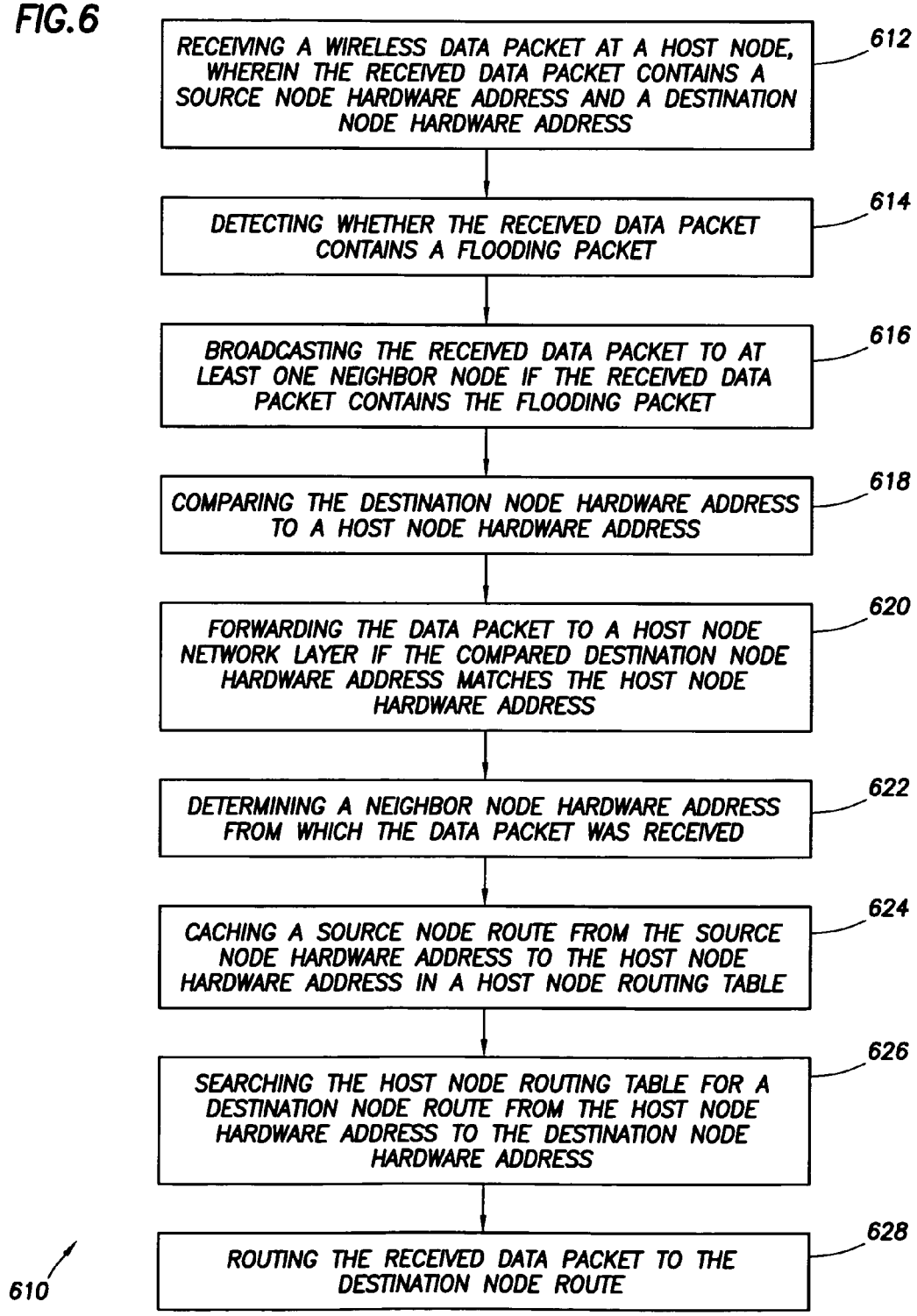
FIG. 6 depicts a third method of mobile ad hoc network routing based upon a hardware address in accordance with a preferred embodiment of the present invention.

Referring now to FIG. 6, a third method of mobile ad hoc network routing based upon a hardware address 610 is depicted. The third method comprises, receiving 612 a wireless data packet at a host node, wherein the received data packet contains a source node hardware address and a destination node hardware address, detecting 614 whether the received data packet contains a flooding packet and broadcasting 616 the received data packet to at least one neighbor node if the received data packet contains the flooding packet. The method also comprises comparing 618 the destination node hardware address to a host node hardware address, forwarding 620 the data packet to a host node network layer if the compared destination node hardware address matches the host node hardware address and determining 622 a neighbor node hardware address from which the data packet was received. The method may also comprise caching 624 a source node route from the source node hardware address to the host node hardware address in a host node routing table, searching 626 the host node routing table for a destination node route from the host node hardware address to the destination node hardware address, and routing 628 the received data packet to the destination node route. The method is performed by software, hardware, or firmware, and/or the combination of software, hardware, and/or firmware.

Figure 7B:
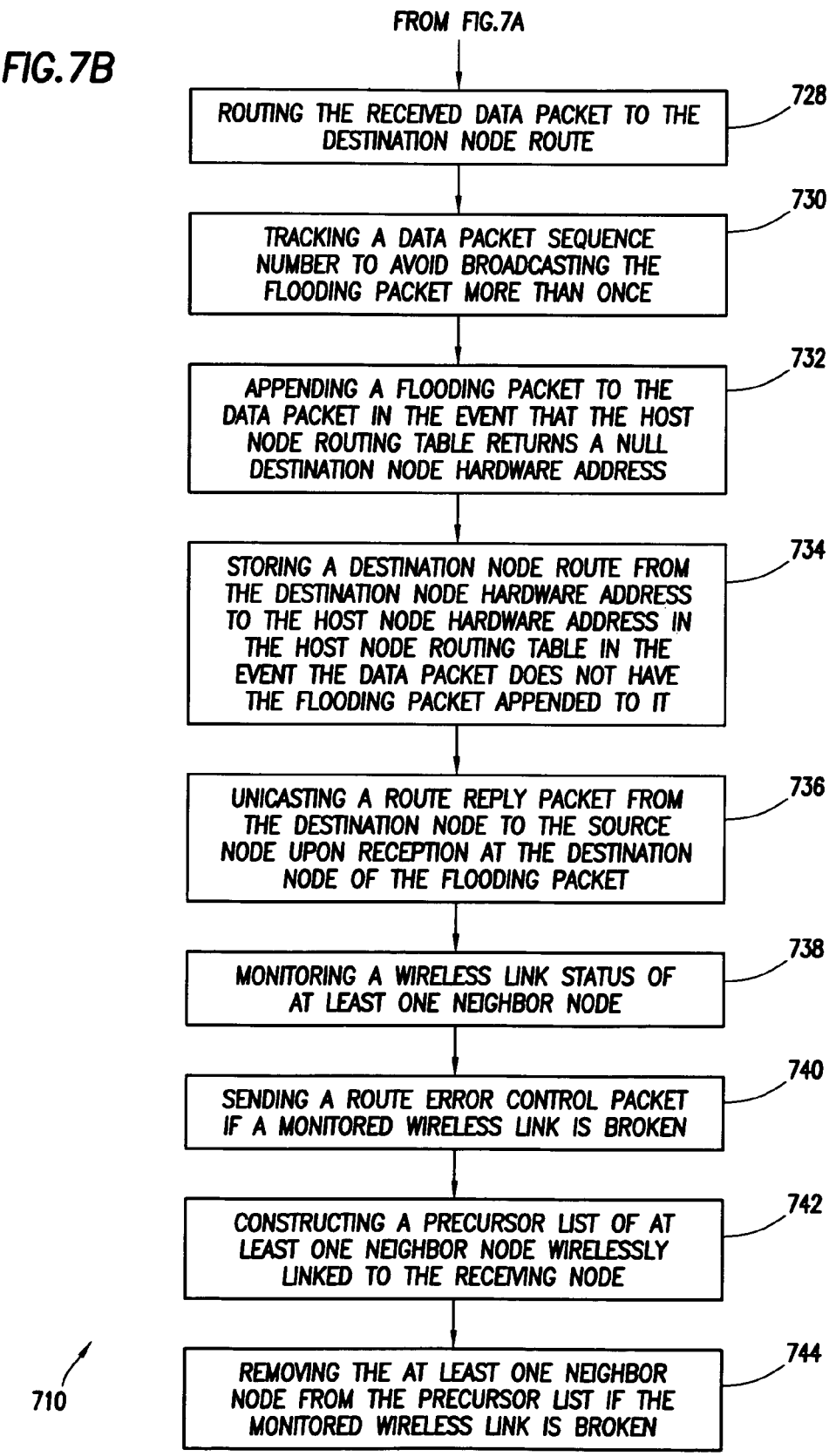
FIG. 7 depicts a fourth method of mobile ad hoc network routing based upon a hardware address in accordance with a preferred embodiment of the present invention.

Referring now to FIG. 7, a fourth method of mobile ad hoc network routing based upon a hardware address 710 is depicted. The fourth method comprises, receiving 712 a wireless data packet at a host node, wherein the received data packet contains a source node hardware address and a destination node hardware address, detecting 714 whether the received data packet contains a flooding packet and broadcasting 716 the received data packet to at least one neighbor node if the received data packet contains the flooding packet. The method also comprises comparing 718 the destination node hardware address to a host node hardware address, forwarding 720 the data packet to a host node network layer if the compared destination node hardware address matches the host node hardware address and determining 722 a neighbor node hardware address from which the data packet was received. The method additionally comprises caching 724 a source node route from the source node hardware address to the host node hardware address in a host node routing table, searching 726 the host node routing table for a destination node route from the host node hardware address to the destination node hardware address, and routing 728 the received data packet to the destination node route. The method may also comprise tracking 730 a data packet sequence number to avoid broadcasting the flooding packet more then once, appending 732 a flooding packet to the data packet in the event that the host node routing table returns a null destination node hardware address and storing 734 a destination node route from the destination node hardware address to the host node hardware address in the host node routing table in the event the data packet does not have the flooding packet appended to it. The method may also comprise unicasting 736 a route reply packet from the destination node to the source node upon reception at the destination node of the flooding packet. The present invention also may comprise monitoring 738 a wireless link status of at the least one neighbor node, sending 740 a route error control packet if a monitored wireless link is broken, constructing 742 a precursor list of at least one neighbor node wirelessly linked to the receiving node and removing 744 the at least one neighbor node from the precursor list if the monitored wireless link is broken. The method is performed by software, hardware, or firmware, and/or the combination of software, hardware, and/or firmware.

Figure 8:
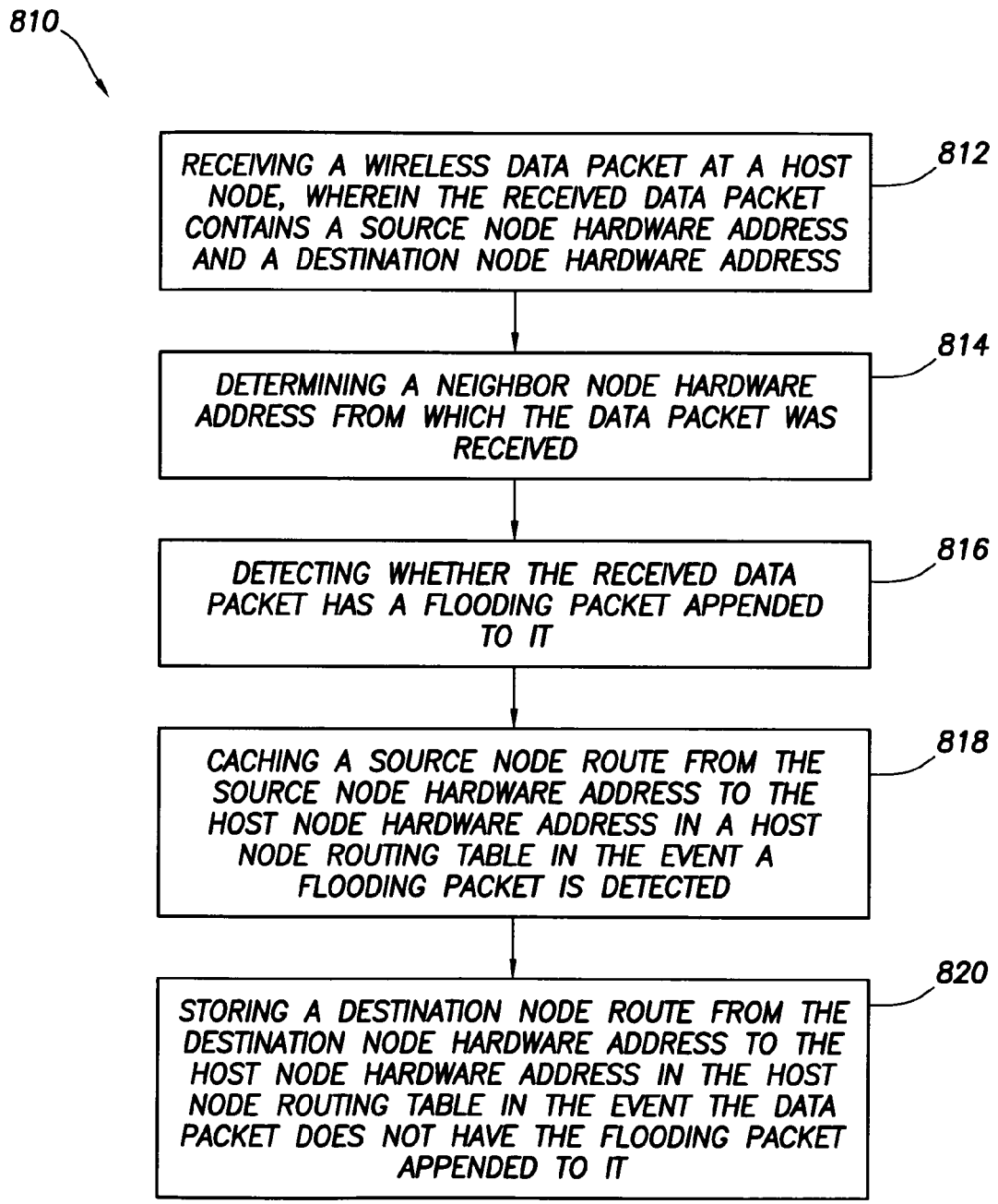
FIG. 8 depicts a first software block diagram of mobile ad hoc network routing based upon a hardware address in accordance with a preferred embodiment of the present invention.

Referring now to FIG. 8, a first software flow diagram of mobile ad hoc network routing based upon a hardware address 810 is depicted. The software or computer readable medium comprises instructions for, receiving 812 a wireless data packet at a host node, wherein the received data packet contains a source node hardware address and a destination node hardware address, determining 814 a neighbor node hardware address from which the data packet was received, and detecting 816 whether the received data packet has a flooding packet appended to it. The computer readable medium further comprises caching 818 a source node route from the source node hardware address to the host node hardware address in a host node routing table in the event a flooding packet is detected, and storing 820 a destination node route from the destination node hardware address to the host node hardware address in the host node routing table in the event the data packet does not have the flooding packet appended to it. This method is preferably embodied in a computer readable medium or software but may also be embodied in firmware and utilized via hardware. The transfer of information occurs via at least one of a wireless protocol, a wired protocol and a combination of the wireless protocol and the wired protocol. The steps performed in this figure are performed by software, hardware, or firmware, and/or the combination of software, hardware, and/or firmware.

Figure 9:
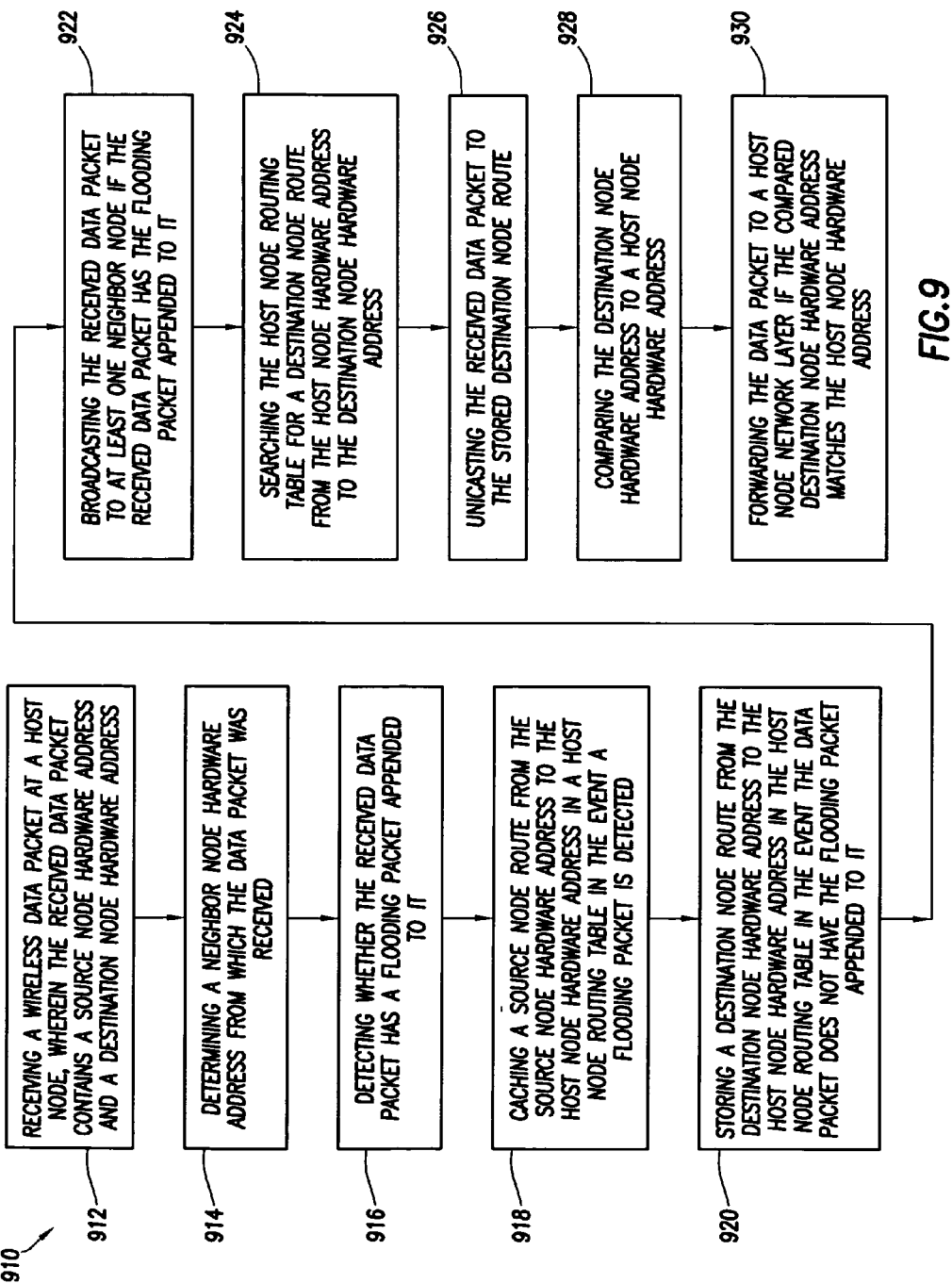
FIG. 9 depicts a second software block diagram of mobile ad hoc network routing based upon a hardware address in accordance with a preferred embodiment of the present invention.

Referring now to FIG. 9, a second software flow diagram of mobile ad hoc network routing based upon a hardware address 910 is depicted. The software or computer readable medium comprises instructions for, receiving 912 a wireless data packet at a host node, wherein the received data packet contains a source node hardware address and a destination node hardware address and determining 914 a neighbor node hardware address from which the data packet was received. The computer readable medium also comprises detecting 916 whether the received data packet has a flooding packet appended to it, caching 918 a source node route from the source node hardware address to the host node hardware address in a host node routing table in the event a flooding packet is detected, and storing 920 a destination node route from the destination node hardware address to the host node hardware address in the host node routing table in the event the data packet does not have the flooding packet appended to it. The computer readable medium may also comprise instructions for broadcasting 922 the received data packet to at least one neighbor node if the received data packet has the flooding packet appended to it, searching 924 the host node routing table for a destination node route from the host node hardware address to the destination node hardware address and unicasting 926 the received data packet to the stored destination node route. The computer readable medium may also comprise comparing 928 the destination node hardware address to a host node hardware address and forwarding 930 the data packet to a host node network layer if the compared destination node hardware address matches the host node hardware address, wherein determination of the neighbor node hardware address is based upon reception speed of the data packet, or reception reliability of the data packet, or upon reception throughput of the data packet, or upon reception cost of the data packet, or upon transmission power required to transmit the data packet. This method is preferably embodied in a computer readable medium or software but may also be embodied in firmware and utilized via hardware. The transfer of information between the repository and the monitor occurs via at least one of a wireless protocol, a wired protocol and a combination of the wireless protocol and the wired protocol. The steps performed in this figure are performed by software, hardware, or firmware, and/or the combination of software, hardware, and/or firmware.

Figure 10:
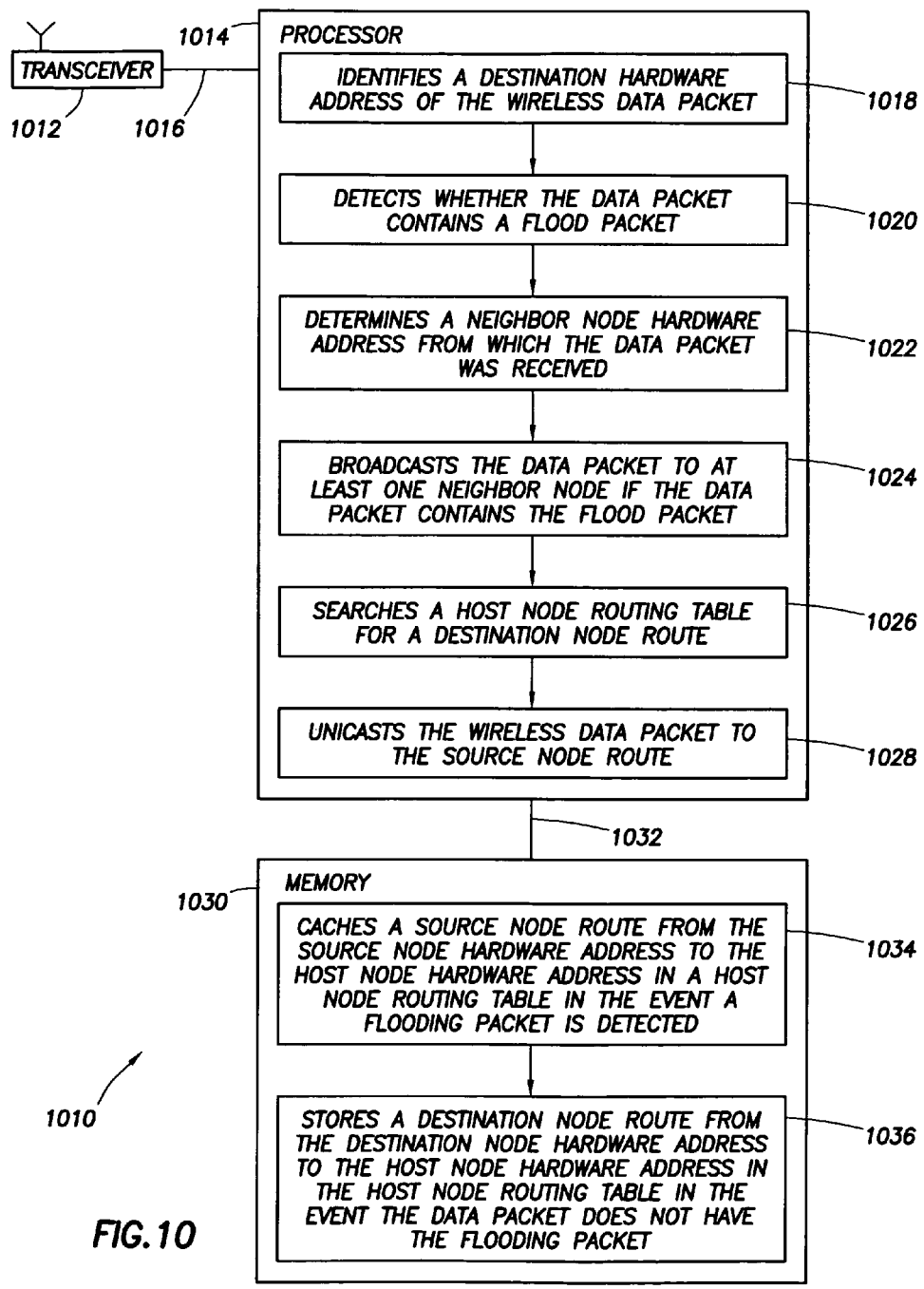
FIG. 10 depicts a mobile ad hoc network routing system based upon a hardware address in accordance with a preferred embodiment of the present invention.

Referring now to FIG. 10, a system of mobile ad hoc network routing based upon a hardware address 1010 is depicted. The system comprises, a transceiver 1012 for receiving and transmitting wireless data packets, a processor 1014 communicably coupled 1016 to the transceiver, wherein the processor identifies 1018 a destination hardware address of the wireless data packet, detects 1020 whether the data packet contains a flood packet, determines 1022 a neighbor node hardware address from which the data packet was received, broadcasts 1024 the data packet to at least one neighbor node if the data packet contains the flood packet, searches 1026 a host node routing table for a destination node route and unicasts 1028 the wireless data packet to the source node route. The system also comprises a memory 1030 communicably coupled 1032 to the processor, wherein the memory stores 1034 a source node route from the source node hardware address to the host node hardware address in a host node routing table in the event a flooding packet is detected and stores 1036 a destination node route from the destination node hardware address to the host node hardware address in the host node routing table in the event the data packet does not have the flooding packet appended to it.

The processor calculates the speed of reception of the data packet from at least one neighbor node, estimates the reliability of reception of the data packet from at least one neighbor node, forecasts the transmission power associated with transmitting the data packet from at least one neighbor node, assesses the reception throughput of the data packet from at least one neighbor node and appraises the reception cost of the data packet from at least one neighbor node. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Although an exemplary embodiment of the system, method and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more processor or memory. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient.

What is claimed is:

1. A method for mobile ad hoc network routing based upon a hardware address, the method comprising:
   identifying a destination node hardware address of a data packet that is outbound from a host node;
   searching a host node routing table for a destination node route from the host node to the destination node hardware address;
   routing the data packet to the destination node route in the event that the host node routing table returns a destination node hardware address;
   adding, to the data packet, a flooding packet as a supplement in the event that the host node routing table returns a null destination node hardware address; and
   broadcasting the data packet to at least one neighbor node if the data packet has the flooding packet appended to it.

2. The method of claim 1, further comprising tracking a data packet sequence number to avoid broadcasting the flooding packet more than once.

3. The method of claim 1, further comprising receiving a data packet that is in inbound to the host node, wherein the received data packet contains a source node hardware address and the destination node hardware address.

4. The method of claim 3, further comprising detecting whether the received data packet contains a flooding packet.

5. The method of claim 4, further comprising comparing the destination node hardware address to a host node hardware address.

6. The method of claim 5, further comprising forwarding the data packet to a host node network layer if the compared destination node hardware address matches the host node hardware address.

7. The method of claim 6, further comprising determining a neighbor node hardware address from which the data packet was received.

8. The method of claim 7, further comprising caching a source node route from the source node hardware address to the host node hardware address in a host node routing table.

9. The method of claim 8, further comprising unicasting a route reply packet from the destination node to the source node upon reception at the destination node of the flooding packet.

10. The method of claim 3, further comprising storing a destination node route from the destination node hardware address to the host node hardware address in the host node routing table in the event the data packet does not have the flooding packet appended to it.

11. A method for mobile ad hoc network routing based upon a hardware address, the method comprising:
receiving a data packet at a host node, wherein the received data packet contains a source node hardware address and a destination node hardware address;
detecting whether the received data packet contains a flooding packet;
broadcasting the received data packet to at least one neighbor node if the received data packet contains the flooding packet;
comparing the destination node hardware address to a host node hardware address;
forwarding the data packet to a host node network layer if the compared destination node hardware address matches the host node hardware address;
determining a neighbor node hardware address from which the data packet was received;
caching a source node route from the source node hardware address to the host node hardware address in a host node routing table;
searching the host node routing table for a destination node route from the host node hardware address to the destination node hardware address; and
routing the received data packet to the destination node route.

12. The method of claim 11, further comprising tracking a data packet sequence number to avoid broadcasting the flooding packet more than once.

13. The method of claim 11, further comprising appending a flooding packet to the data packet in the event that the host node routing table returns a null destination node hardware address.

14. The method of claim 11, further comprising storing a destination node route from the destination node hardware address to the host node hardware address in the host node routing table in the event the data packet does not have the flooding packet appended to it.

15. The method of claim 14, further comprising unicasting a route reply packet from the destination node to the source node upon reception at the destination node of the flooding packet.

16. The method of claim 11, further comprising monitoring a wireless link status of at the least one neighbor node.

17. The method of claim 16, further comprising sending a route error control packet if the monitored wireless link is broken.

18. The method of claim 11, further comprising constructing a precursor list of at least one neighbor node wirelessly linked to the receiving node.

19. The method of claim 18, further comprising removing the at least one neighbor node from the precursor list if the monitored wireless link is broken.

20. The method of claim 11, wherein the host node routing table includes a source node internet protocol address.

21. The method of claim 11, wherein the host node routing table includes a destination node internet protocol address.

22. A non-transitory computer readable medium for use in a mobile ad hoc network, the computer readable medium coupled to a processor and configured to store a plurality of instructions, the plurality of instructions configured to cause the processor to:
receive a wireless data packet at a host node, wherein the received data packet contains a source node hardware address and a destination node hardware address;
determine a neighbor node hardware address from which the data packet was received;
detect whether the received data packet has a flooding packet appended to it;
cache a source node route from the source node hardware address to the host node hardware address in a host node routing table in the event a flooding packet is detected; and
store a destination node route from the destination node hardware address to the host node hardware address in the host node routing table in the event the data packet does not have the flooding packet appended to it.

23. The computer readable medium of claim 22, wherein the plurality of instructions further are configured to cause the processor to broadcast the received data packet to at least one neighbor node if the received data packet has the flooding packet appended to it.

24. The computer readable medium of claim 22, wherein the plurality of instructions further are configured to cause the processor to search the host node routing table for a destination node route from the host node hardware address to the destination node hardware address.

25. The computer readable medium of claim 24, wherein the plurality of instructions further are configured to cause the processor to unicast the received data packet to the stored destination node route.

26. The computer readable medium of claim 22, wherein the plurality of instructions further are configured to cause the processor to compare the destination node hardware address to a host node hardware address.

27. The computer readable medium of claim 26, wherein the plurality of instructions further are configured to cause the processor to forward the data packet to a host node network layer if the compared destination node hardware address matches the host node hardware address.

28. The computer readable medium of claim 22, wherein the plurality of instructions are configured to cause the processor to determine the neighbor node hardware address based upon a reception speed of the data packet.

29. The computer readable medium of claim 22, wherein the plurality of instructions are configured to cause the processor to determine the neighbor node hardware address based upon a reception reliability of the data packet.

30. The computer readable medium of claim 22, wherein the plurality of instructions are configured to cause the processor to determine the neighbor node hardware address based upon a reception throughput of the data packet.

31. The computer readable medium of claim 22, wherein the plurality of instructions are configured to cause the processor to determine the neighbor node hardware address based upon a reception cost of the data packet.

32. The computer readable medium of claim 22, wherein the plurality of instructions are configured to cause the processor to determine the neighbor node hardware address based upon a transmission power required to transmit the data packet.

33. A system for mobile ad hoc network routing based upon a hardware address, the system comprising:
a transceiver configured to receive and transmit wireless data packets;
a processor communicably coupled to the transceiver, wherein the processor is configured to:
identify a destination hardware address of the wireless data packet,
detect whether the data packet contains a flood packet,
determine a neighbor node hardware address from which the data packet was received,
broadcast the data packet to at least one neighbor node if the data packet contains the flood packet,
search a host node routing table for a destination node route, and
unicast the wireless data packet to a source node route; and
a memory communicably coupled to the processor, wherein the memory is configured to store the source node route from the source node hardware address to the host node hardware address in a host node routing table in the event the flooding packet is detected and store the destination node route from the destination node hardware address to the host node hardware address in the host node routing table in the event the data packet does not have the flooding packet.

34. The system of claim 33, wherein the processor is configured to calculate the speed of reception of the data packet from at least one neighbor node.

35. The system of claim 33, wherein the processor is configured to estimate the reliability of reception of the data packet from at least one neighbor node.

36. The system of claim 33, wherein the processor is configured to forecast the transmission power associated with transmitting the data packet from at least one neighbor node.

37. The system of claim 33, wherein the processor is configured to assess the reception throughput of the data packet from at least one neighbor node.

38. The system of claim 33, wherein the processor is configured to appraise the reception cost of the data packet from at least one neighbor node.

39. A system for mobile ad hoc network routing based upon a hardware address, the system comprising:
a processor configured to:
receive a data packet at a host node, wherein the received data packet contains a source node hardware address and a destination node hardware address;
detect whether the received data packet contains a flooding packet;
broadcast the received data packet to at least one neighbor node if the received data packet contains the flooding packet;
compare the destination node hardware address to a host node hardware address:
forward the data packet to a host node network layer if the compared destination node hardware address matches the host node hardware address;
determine a neighbor node hardware address from which the data packet was received;
cache a source node route from the source node hardware address to the host node hardware address in a host node routing table;
search the host node routing table for a destination node route from the host node hardware address to the destination node hardware address; and
route the received data packet to the destination node route.

* * * * *